(12) United States Patent
Kim

(10) Patent No.: US 11,515,605 B2
(45) Date of Patent: Nov. 29, 2022

(54) BATTERY MODULE

(71) Applicant: Samsung SDI Co., Ltd., Yongin-si (KR)

(72) Inventor: Wonsung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 353 days.

(21) Appl. No.: 16/303,467

(22) PCT Filed: May 23, 2017

(86) PCT No.: PCT/KR2017/005319
§ 371 (c)(1),
(2) Date: Nov. 20, 2018

(87) PCT Pub. No.: WO2017/209428
PCT Pub. Date: Dec. 7, 2017

(65) Prior Publication Data
US 2020/0321595 A1    Oct. 8, 2020

(30) Foreign Application Priority Data
May 30, 2016    (KR) .................. 10-2016-0066359

(51) Int. Cl.
*H01M 6/42*        (2006.01)
*H01M 50/507*    (2021.01)
(Continued)

(52) U.S. Cl.
CPC ......... *H01M 50/561* (2021.01); *H01M 50/20* (2021.01); *H01M 50/531* (2021.01)

(58) Field of Classification Search
CPC ...... H01M 2/307; H01M 2/1077; H01M 2/26; H01M 2/20; H01M 2/10; H01M 2/206;
(Continued)

(56) References Cited

U.S. PATENT DOCUMENTS 9,484,566 B2 * 11/2016 Lee .................. H01M 2/202
2004/0197642 A1    10/2004 Sato
(Continued)

FOREIGN PATENT DOCUMENTS

CN        1551384 A      12/2004
CN      101141009 A       3/2008
(Continued)

OTHER PUBLICATIONS

International Search Report of corresponding PCT/KR2017/005319, dated Aug. 25, 2017, 5 pages.
(Continued)

*Primary Examiner* — Cynthia H Kelly
*Assistant Examiner* — Julian Anthony
(74) *Attorney, Agent, or Firm* — Lewis Roca Rothgerber Christie LLP

(57) ABSTRACT

Provided is a battery module. The battery module includes: a plurality of battery cells each including an electrode terminal; and a bus bar connected to the electrode terminals of the battery cells neighboring each other to electrically connect the battery cells, the bus bar including a first bus bar and a second bus bar that are superposed on each other and include different metals, each of the first and second bus bars making conductive contact with the electrode terminals. Therefore, the thermal and electrical characteristics of the bus bar electrically connecting the neighboring battery cells to each other may be improved while improving weldability between the bus bar and electrode terminals.

17 Claims, 5 Drawing Sheets

(51) Int. Cl.
*H01M 50/503* (2021.01)
*H01M 50/552* (2021.01)
*H01M 50/20* (2021.01)
*H01M 50/531* (2021.01)

(58) Field of Classification Search
CPC ........... H01M 2/1072; H01M 2220/20; H01M 2220/10; Y02E 60/10
See application file for complete search history.

(56) References Cited

U.S. PATENT DOCUMENTS

| | | | |
|---|---|---|---|
| 2008/0063932 A1 | 3/2008 | Ishizu et al. | |
| 2011/0064993 A1 | 3/2011 | Ochi | |
| 2011/0159353 A1* | 6/2011 | Byun | H01M 50/528 429/160 |
| 2012/0009461 A1* | 1/2012 | Kim | H01M 2/1077 429/158 |
| 2012/0129041 A1* | 5/2012 | Komazawa | H01M 2/1077 429/158 |
| 2013/0089996 A1 | 4/2013 | Zhao | |
| 2013/0130572 A1 | 5/2013 | Sakae | |
| 2014/0023897 A1* | 1/2014 | Suga | H01M 10/425 429/90 |
| 2015/0079453 A1 | 3/2015 | Choi et al. | |
| 2015/0086834 A1* | 3/2015 | Cho | H01M 50/502 429/121 |
| 2015/0086867 A1 | 3/2015 | Oda et al. | |
| 2015/0179995 A1* | 6/2015 | Nakamura | H01M 10/613 429/120 |

FOREIGN PATENT DOCUMENTS

| | | |
|---|---|---|
| CN | 104466220 A | 3/2015 |
| CN | 204441494 U | 7/2015 |
| CN | 105261723 A | 1/2016 |
| CN | 205050907 U | 2/2016 |
| JP | 2011-60623 A | 3/2011 |
| JP | 2013-246991 A | 12/2013 |
| JP | 2015-49930 A | 3/2015 |
| JP | 2015-88443 A | 5/2015 |
| KR | 10-2012-0004189 A | 1/2012 |
| KR | 10-2013-0080041 A | 7/2013 |
| KR | 10-2014-0053400 A | 5/2014 |
| KR | 10-2015-0031093 A | 3/2015 |

OTHER PUBLICATIONS

Written Opinion of the International Searching Authority of corresponding PCT/KR2017/005319, dated Aug. 25, 2017, 8 pages.

* cited by examiner

BATTERY MODULE

CROSS-REFERENCE TO RELATED APPLICATION(S)

This application is a National Phase Patent Application of International Patent Application Number PCT/KR2017/005319, filed on May 23, 2017, which claims priority of Korean Patent Application No. 10-2016-0066359, filed May 30, 2016. The entire contents of both of which are incorporated herein by reference.

TECHNICAL FIELD

The present disclosure relates to a battery module including two or more battery cells.

BACKGROUND ART

In general, secondary batteries are rechargeable unlike non-rechargeable primary batteries. Secondary batteries are used as energy sources of devices such as mobile devices, electric vehicles, hybrid vehicles, electric bicycles, or uninterruptible power supplies. Secondary batteries are individually used or secondary battery modules each including a plurality of secondary batteries connected as one unit are used according to the types of external devices using secondary batteries.

Unlike small mobile devices such as cellular phones each operable for a certain period of time using a single battery, devices such as electric vehicles or hybrid vehicles having long operation times and consuming large amounts of electricity may prefer battery modules each including a plurality of batteries (battery cells) to handle problems relating to power and capacity, and the output voltages or currents of battery modules may be increased by adjusting the number of batteries included in each battery module.

DESCRIPTION OF EMBODIMENTS

Technical Problem

An embodiment of the present disclosure includes a battery module configured to improve the weldability of a bus bar electrically connecting battery cells to each other.

An embodiment of the present disclosure includes a battery module configured to improve the thermal and electrical characteristics of a bus bar while improving the weldability of the bus bar.

Solution to Problem

According to an embodiment of the present disclosure, a battery module includes: a plurality of battery cells each including an electrode terminal; and a bus bar connected to the electrode terminals of the battery cells neighboring each other to electrically connect the battery cells, the bus bar including a first bus bar and a second bus bar that are superposed on each other and include different metals, each of the first and second bus bars making conductive contact with the electrode terminals.

Advantageous Effects of Disclosure

The present disclosure provides a battery module configured to improve the thermal and electrical characteristics of a bus bar electrically connecting neighboring battery cells to each other while improving weldability between the bus bar and electrode terminals.

According to the present disclosure, the bus bar is formed of different metallic materials such that the bus bar may be welded to the electrode terminals by similar metal welding while improving the thermal and electrical characteristics of the bus bar owing to a metal of the bus bar different from the electrode terminals.

BEST MODE

Figure 1:
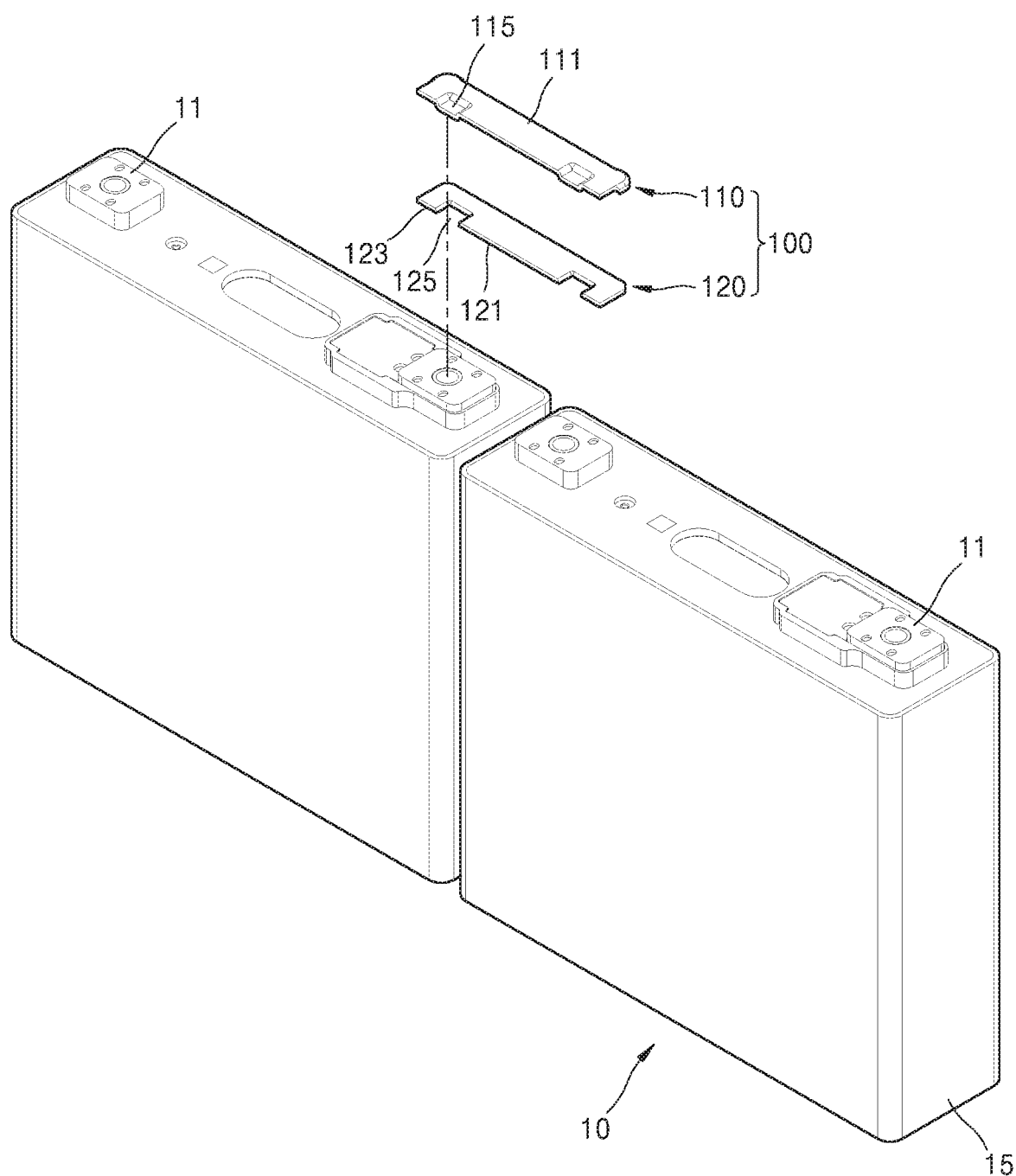
FIG. 1 is a perspective view illustrating a battery module according to an embodiment of the present disclosure.

According to an embodiment of the present disclosure, a battery module includes: a plurality of battery cells each including an electrode terminal; and a bus bar connected to the electrode terminals of the battery cells neighboring each other to electrically connect the battery cells, the bus bar including a first bus bar and a second bus bar that are superposed on each other and include different metals, each of the first and second bus bars making conductive contact with the electrode terminals.

For example, the second bus bar is placed between the first bus bar and the electrode terminals.

For example, each of the first and second bus bars makes contact with the electrode terminals.

For example, the first bus bar includes: a main body; and coupling portions stepped from the main body toward the electrode terminals and coupled to the electrode terminals.

For example, the second bus bar includes: a main body; and penetration holes facing the coupling portions.

For example, the coupling portions of the first bus bar are coupled to the electrode terminals through the penetration holes of the second bus bar.

For example, slopes inclined with respect to contact surfaces of the electrode terminals are provided on ends of the coupling portions of the first bus bar and the penetration holes of the second bus bar.

For example, the first bus bar includes a pair of coupling portions respectively coupled to the electrode terminals of the battery cells neighboring each other.

For example, the coupling portions of the first bus bar are welded to the electrode terminals.

For example, the main body of the first bus bar forms a non-contact portion that does not make contact with the electrode terminals, and the main body of the second bus bar includes contact portions that make contact with the electrode terminals.

For example, the contact portions are provided around the penetration holes.

For example, the first and second bus bars have a rectangular shape, and guide portions are provided on corner portions of the first bus bar, the guide portions protruding toward the second bus bar and surrounding corner portions of the second bus bar.

For example, the main body of the first bus bar and the main body of the second bus bar make conductive contact with each other.

For example, the main body of the first bus bar and the main body of the second bus bar include matching portions having complementary shapes for reducing contact resistance therebetween.

For example, the matching portions include: a convex portion provided on one of the main bodies of the first and second bus bars; and a concave portion provided on the other of the main bodies of the first and second bus bars for receiving the convex portion.

For example, the matching portions include: an opening formed in the main body of the first bus bar; and a protrusion provided on the main body of the second bus bar and insertable into the opening.

For example, the first bus bar includes the same metal as the electrode terminals of the battery cells.

For example, the second bus bar includes a metal different from the electrode terminals of the battery cells.

For example, the second bus bar includes a metallic material having higher electrical conductivity than the first bus bar.

Mode of Disclosure

Hereinafter, a battery module will be described according to an embodiment of the present disclosure with reference to the accompanying drawings.

Figure 2:
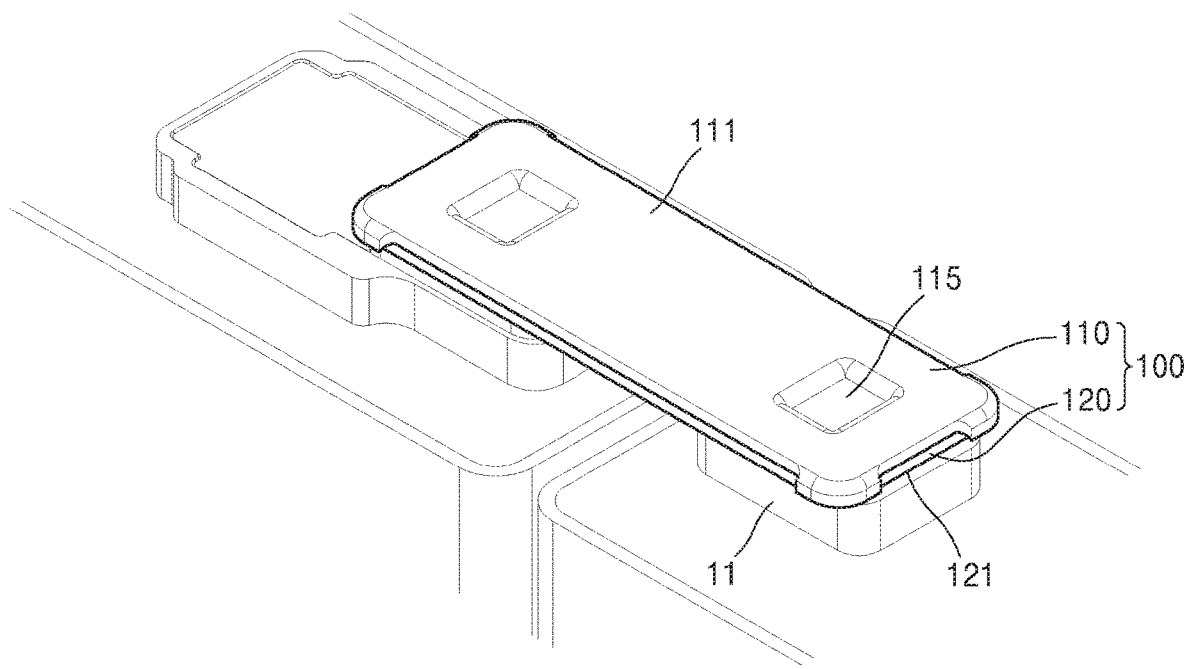
FIGS. 2 and 3 are perspective views illustrating portions of the battery module depicted in FIG. 1.
Figure 3:
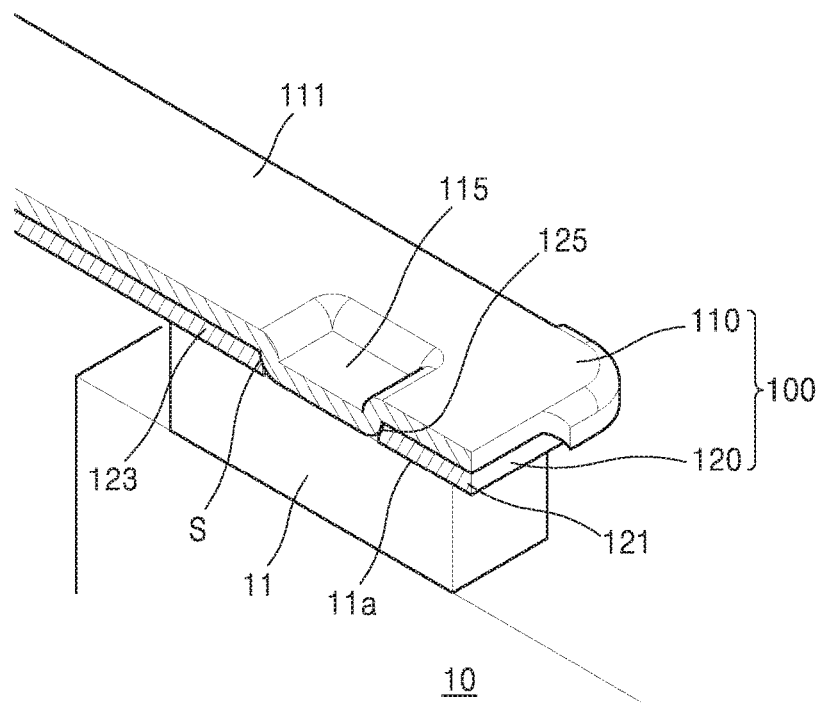
Figure 4:
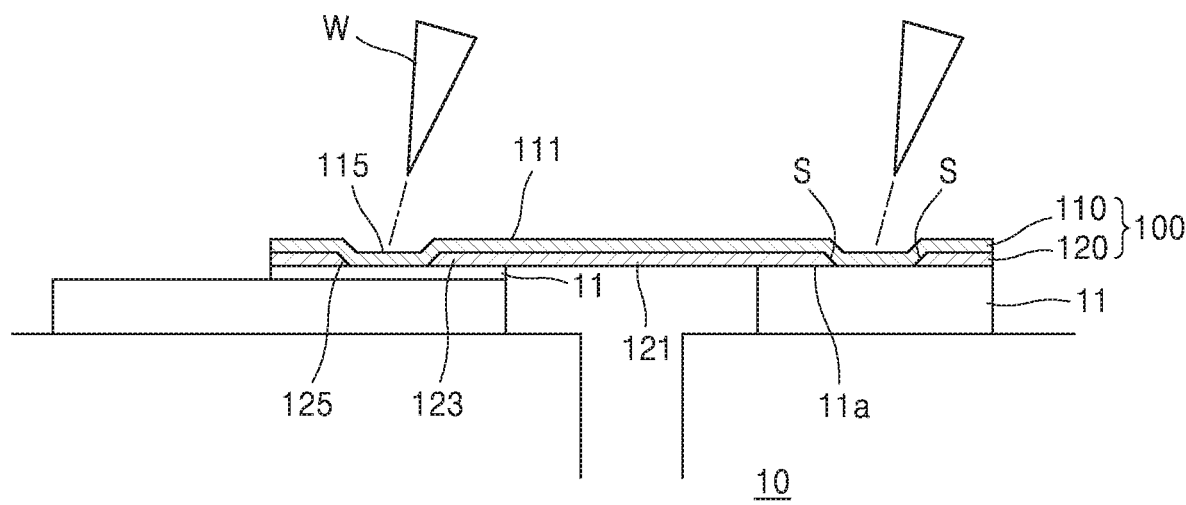
FIG. 4 is a view illustrating a coupled state between a bus bar and electrode terminals.

FIG. 1 is a perspective view illustrating a battery module according to an embodiment of the present disclosure. FIGS. 2 and 3 are perspective views illustrating portions of the battery module depicted in FIG. 1. FIG. 4 is a view illustrating a coupled state between a bus bar and electrode terminals.

Referring to the drawings, the battery module may include at least two battery cells 10. Each of the battery cells 10 may include a case 15 accommodating an electrode assembly (not shown), and electrode terminals 11 provided on an outer side of the case and forming a charge-discharge current path.

In the drawings attached to the present disclosure, two battery cells 10 are illustrating. However, the battery module may include at least two battery cells 10. In this case, neighboring battery cells 10 may be electrically connected to each other. For example, a plurality of battery cells 10 may be electrically connected in series, parallel, or series-parallel to each other to satisfy required electrical output power. For example, neighboring battery cells 10 may be connected in series to each other by connecting electrode terminals 11 of the neighboring battery cells 10 having different polarities to each other, or neighboring battery cells 10 may be connected in parallel to each other by connecting electrode terminals 11 of the neighboring battery cells 10 having the same polarity. As described later, a plurality of battery cells 10 may be connected to each other by connecting neighboring electrode terminals 11 of the battery cells 10 to each other using a bus bar 100.

The battery module may include the bus bar 100 to connect electrode terminals 11 of neighboring battery cells 10. The bus bar 100 may be provided over electrode terminals 11 of neighboring battery cells 10. The bus bar 100 may be provided over a pair of neighboring electrode terminals 11 to electrically connect neighboring battery cells 10.

The bus bar 100 may include first and second bus bars 110 and 120 formed of different materials. For example, the first and second bus bars 110 and 120 may be formed of first and second metallic materials that are different from each other.

The first and second bus bars 110 and 120 may be superposed on each other, and each of the first and second bus bars 110 and 120 may make conductive contact with electrode terminals 11. For example, each of the first and second bus bars 110 and 120 may be physically brought into contact with the electrode terminals 11. For example, the expression "the first and second bus bars 110 and 120 make conductive contact with electrode terminals 11" may mean that the first and second bus bars 110 and 120 make physical contact with the electrode terminals 11. For example, the expression may mean that each of the first and second bus bars 110 and 120 makes physical contact with the electrode terminals 11 instead of meaning that only the second bus bar 120 of the first and second bus bars 110 and 120 makes physical contact with the electrode terminals 11 and the first bus bar 110 is electrically connected to the electrode terminals 11 through the second bus bar 120.

More specifically, the first and second bus bars 110 and 120 are superposed on each other above the electrode terminals 11. The first and second bus bars 110 and 120 may be arranged in such a manner that the first bus bar 110 is relatively distant from the electrode terminals 11 and forms an upper portion of the bus bar 100. The second bus bar 120 may be relatively close to the electrode terminals 11 and may form a lower portion of the bus bar 100.

The first and second bus bars 110 and 120 are superposed on each other in such a manner that the second bus bar 120 is above the electrode terminals 11, and the first bus bar 110 is above the second bus bar 120. In this manner, the electrode terminals 11, the second bus bar 120, and the first bus bar 110 may be sequentially stacked. The second bus bar 120 arranged directly above the electrode terminals 11 may make contact with the electrode terminals 11, and the first bus bar 110 blocked by the second bus bar 120 may also make contact with the electrode terminals 11. In this case, the first bus bar 110 may make contact with the electrode terminals 11 through penetration holes 125 formed through the second bus bar 120.

The first and second bus bars 110 and 120 make conductive contact with the electrode terminals 11. As described later, the first bus bar 110 may make conductive contact with the electrode terminals 11 through coupling portions 115, and the second bus bar 120 may make conductive contact with the electrode terminals 11 through contact portions 123.

The first bus bar 110 includes the coupling portions 115 for coupling with the electrode terminals 11. For example, the first bus bar 110 may include a pair of coupling portions 115 for coupling with a pair of electrode terminals 11.

The coupling portions 115 may be stepped down from a main body of the first bus bar 110 toward the electrode terminals 11. In addition, the coupling portions 115 of the first bus bar 110 may make contact with the electrode terminals 11 through the penetration holes 125 of the second bus bar 120. More specifically, the coupling portions 115 of the first bus bar 110 may face the penetration holes 125 of the second bus bar 120 and may be inserted into the penetration holes 125 of the second bus bar 120. That is, the coupling portions 115 of the first bus bar 110 may be exposed to the electrode terminals 11 through the penetration holes 125 of the second bus bar 120, and the coupling portions 115 and the electrode terminals 11 facing each other through the penetration holes 125 may be welded together.

As shown in FIG. 4, the coupling portions 115 and the electrode terminals 11 may be welded together using a laser W. For example, all the first bus bar 110 and the electrode terminals 11 may include an aluminum material and may be securely coupled to each other by laser welding (W). Like the electrode terminals 11, the first bus bar 110 may be formed of the first metallic material, that is, an aluminum material to improve weldability to the electrode terminals 11 and to form secure coupling between similar metals. For example, material characteristics such as the melting point or cooling rate of a base metal directly relate to weldability, and thus since the first bus bar 110 and the electrode terminals 11 are formed of similar metallic materials or the same metallic material, a decrease in weldability or weld strength caused by mismatched material characteristics may be prevented. For example, a difference in melting point or cooling rate may cause weld defects such as cracks.

The first bus bar 110 and the electrode terminals 11 are formed of the same first metallic material, and the second bus bar 120 formed of the second metallic material different from the material of the first bus bar 110 is combined with the first bus bar 110 such that required thermal and electrical characteristics of the bus bar 100 may be improved.

The bus bar 100 electrically connects a pair of neighboring electrode terminals 11 and thus forms a charge-discharge current path. The bus bar 100 provides a low-resistance, high-current path, thereby decreasing ohmic loss and increasing electrical output power performance. To this end, the second metallic material having better thermal and electrical characteristics than the first metallic material may be combined with the first metallic material to decrease Joule heating of the bus bar 100 and improve electrical output power characteristics. For example, the first bus bar 110 and the electrode terminals 11 may include the same aluminum material, and the second bus bar 120 may include copper having better thermal and electrical characteristics than aluminum.

If the bus bar 100 is form of a single material, for example, the same aluminum material as the electrode terminals 11 by considering weldability, the electrical resistance of the bus bar 100 may increase. In this case, ohmic loss may increase in the high-current path, and charge-discharge characteristics may deteriorate because of Joule heating. In addition, if the bus bar 100 is formed of a single copper material by considering the characteristics of the bus bar 100, welding may not be easily performed because of a mismatch between the melting point and cooling rate of the bus bar 100 and the melting point and cooling rate of the electrode terminals 11 formed of an aluminum material.

In an embodiment of the present disclosure, the bus bar 100 is provided by combining the first and second bus bars 110 and 120 formed of the first and second metallic materials that are different from each other, and thus weldability to the electrode terminals 11 and thermal and electrical characteristics of the bus bar 100 may all be satisfactory.

The second bus bar 120 may include the penetration holes 125 to expose the coupling portions 115 of the first bus bar 110 to the electrode terminals 11. The penetration holes 125 of the second bus bar 120 may be formed at positions facing the coupling portions 115 of the first bus bar 110. For example, the second bus bar 120 may include a pair of penetration holes 125 for a pair of electrode terminals 11 to be coupled.

The contact portions 123 may be formed around the penetration holes 125. The second bus bar 120 may make conductive contact with the electrode terminals 11 through the contact portions 123. The second bus bar 120 may be compressed by pressure between the first bus bar 110 and the electrode terminals 11. For example, the second bus bar 120 may be compressed by pressure and make conductive contact with the first bus bar 110 and the electrode terminals 11 owing to coupling force between the first bus bar 110 and the electrode terminals 11. In this case, sufficient conductive contact may be guaranteed between the contact portions 123 of the second bus bar 120 and the electrode terminals 11. Here, the expression "sufficient conductive contact is formed" may mean that a charge-discharge current flows from the electrode terminals 11 through the contact portions 123 because contact resistance between the contact portions 123 and the electrode terminals 11 is sufficiently low.

Portions of the electrode terminals 11 facing the penetration holes 125 may make conductive contact with the first bus bar 110 (specifically, with the coupling portions 115), and portions of the electrode terminals 11 not facing the penetration holes 125, that is, portions of the electrode terminals 11 facing peripheral portions of the penetration holes 125 may make conductive contact with the second bus bar 120 (specifically, with the contact portions 123). In this manner, the electrode terminals 11 may make conductive contact with the bus bar 100 through all portions of the electrode terminals 11 facing the bus bar 100.

The second bus bar 120 may be formed of a metallic material different from a material of the first bus bar 110. For example, the first bus bar 110 may be formed of the same first metallic material as the electrode terminals 11, that is, an aluminum material by considering weldability between the first bus bar 110 and the electrode terminals 11. In addition, the second bus bar 120 may be formed of the second metallic material different from the first metallic material to improve the thermal and electrical characteristics of the bus bar 100. That is, the second bus bar 120 may be formed of a copper material different from the aluminum material of the first bus bar 110.

Each of the first and second bus bars 110 and 120 may make conductive contact with the electrode terminals 11 and may make electrical contact with each other. For example, the first and second bus bars 110 and 120 may be superposed on each other and may make conductive contact with each other by inserting the coupling portions 115 into the penetration holes 125 above the electrode terminals 11. In this case, the first bus bar 110 may make conductive contact with the electrode terminals 11 through coupling portions 115, and the second bus bar 120 may make conductive contact with the electrode terminals 11 through contact portions 123 provided around the penetration holes 125.

Owing to conductive contact between the first and second bus bars 110 and 120, the first and second bus bars 110 and 120 may share the function of the bus bar 100. For example, a charge-discharge current flowing from one of the electrode terminals 11 to the first bus bar 110 through one of the coupling portions 115 may reach the other of the electrode terminals 11 through the second bus bar 120 having relatively low electrical resistance. In this manner, all the first and second bus bars 110 and 120 are involved in conducting a charge-discharge current, and thus the characteristics of the second bus bar 120 may directly contribute to improving the characteristics of the bus bar 100. For example, contact resistance between the electrode terminals 11 and the coupling portions 115 welded to the electrode terminals 11 may be lower than contact resistance between the electrode terminals 11 and the contact portions 123 making conductive contact with the electrode terminals 11. In this case, although a charge-discharge current from one of the electrode terminals 11 may flow to the first bus bar 110 through the coupling portions 115 having relatively low contact resistance, the charge-discharge current may then flow to the other of the electrode terminals 11 through a relatively low resistance path formed by the second bus bar 120 making conductive contact with the first bus bar 110.

As described above, all the coupling portions 115 of the first bus bar 110 and the contact portions 123 of the second bus bar 120 sufficiently make conductive contact with the electrode terminals 11, and thus a current may be distributed such that a portion of the current may flow to the first bus bar 110 through the coupling portions 115 and the rest of the current may flow to the second bus bar 120 through the contact portions 123. In this manner, the coupling portions 115 and the contact portions 123 make conductive contact with the electrode terminals 11 across the entire area of the electrode terminals 11, and thus the resistance of the charge-discharge current path may be reduced.

The first bus bar 110 may include a main body 111 and the coupling portions 115 stepped from the main body 111 toward the electrode terminals 11 for coupling with the electrode terminals 11. In this case, the main body 111 of the first bus bar 110 may form a non-contact portion that does not make contact with the electrode terminals 11. The first bus bar 110 may be electrically connected to the electrode terminals 11 through the coupling portions 115 welded to the electrode terminals 11, and the main body 111 of the first bus bar 110 except for the coupling portions 115 may form a non-contact portion that does not make contact with the electrode terminals 11.

The second bus bar 120 may include a main body 121 and the penetration holes 125 which are open toward the electrode terminals 11. In this case, the main body 121 of the second bus bar 120 may include the contact portions 123 that make conductive contact with the electrode terminals 11. For example, the contact portions 123 may be formed around the penetration holes 125 in a length direction of the second bus bar 120.

The first and second bus bars 110 and 120 may be related such that the coupling portions 115 of the first bus bar 110 may face the penetration holes 125 of the second bus bar 120. For example, the coupling portions 115 of the first bus bar 110 may be provided as a pair corresponding to a pair of neighboring electrode terminals 11. Similarly, the penetration holes 125 of the second bus bar 120 may be provided as a pair corresponding to the pair of neighboring electrode terminals 11.

The coupling portions 115 of the first bus bar 110 and the penetration holes 125 of the second bus bar 120 may include slopes S inclined at given angles from contact surfaces 11a of the electrode terminals 11. For example, a pair of slopes S facing each other with the coupling portions 115 or the penetration holes 125 therebetween may be inclined such that the pair of slopes S may have a width decreasing toward the electrode terminals 11. The coupling portions 115 and the penetration holes 125 may be in contact with each other through the slopes S, and the coupling portions 115 may be stably supported on the slopes S inclined at the given angles.

The main bodies 111 and 121 of the first and second bus bars 110 and 120 may make conductive contact with each other. Since the main bodies 111 and 121 of the first and second bus bars 110 and 120 make conductive contact with each other, the first and second bus bars 110 and 120 may share the flow of current between the battery cells 10 neighboring each other.

Figure 5:
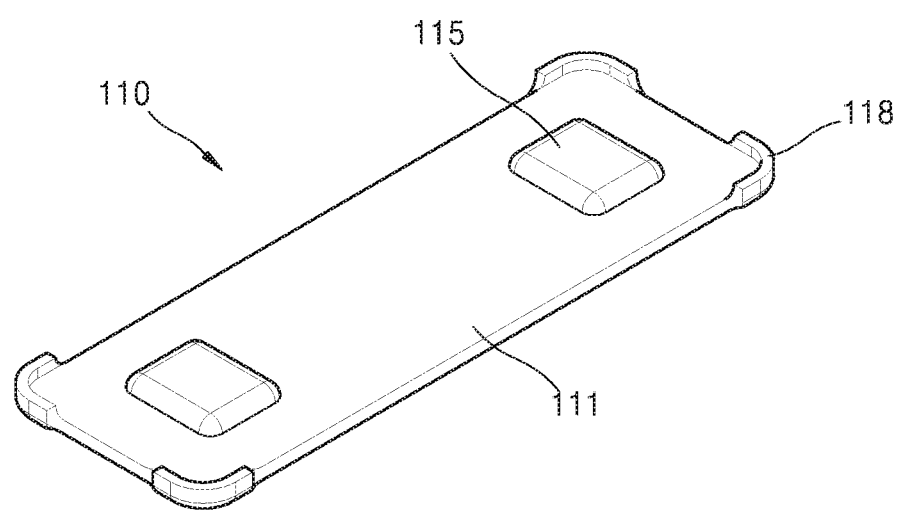
FIG. 5 is a lower side view illustrating a first bus bar according to the embodiment of the present disclosure.

FIG. 5 is a lower side view illustrating the first bus bar 110 according to the embodiment of the present disclosure. A lower surface of the first bus bar 110 may refer to a surface of the first bus bar 110 facing the second bus bar 120. Guide portions 118 may be formed on the lower surface of the first bus bar 110. The guide portions 118 are for alignment between the first and second bus bars 110 and 120. That is, the first and second bus bars 110 and 120 may be vertically aligned with each other such that the coupling portions 115 and the penetration holes 125 may be naturally aligned with each other. The first and second bus bars 110 and 120 may approximately have a rectangular plate shape. In this case, the guide portions 118 may be formed at four corner portions of the first bus bar 110 and may protrude from the first bus bar 110 toward the second bus bar 120. The first and second bus bars 110 and 120 may be easily aligned with each other by fitting the guide portions 118 around four corner portions of the second bus bar 120.

Figure 6:
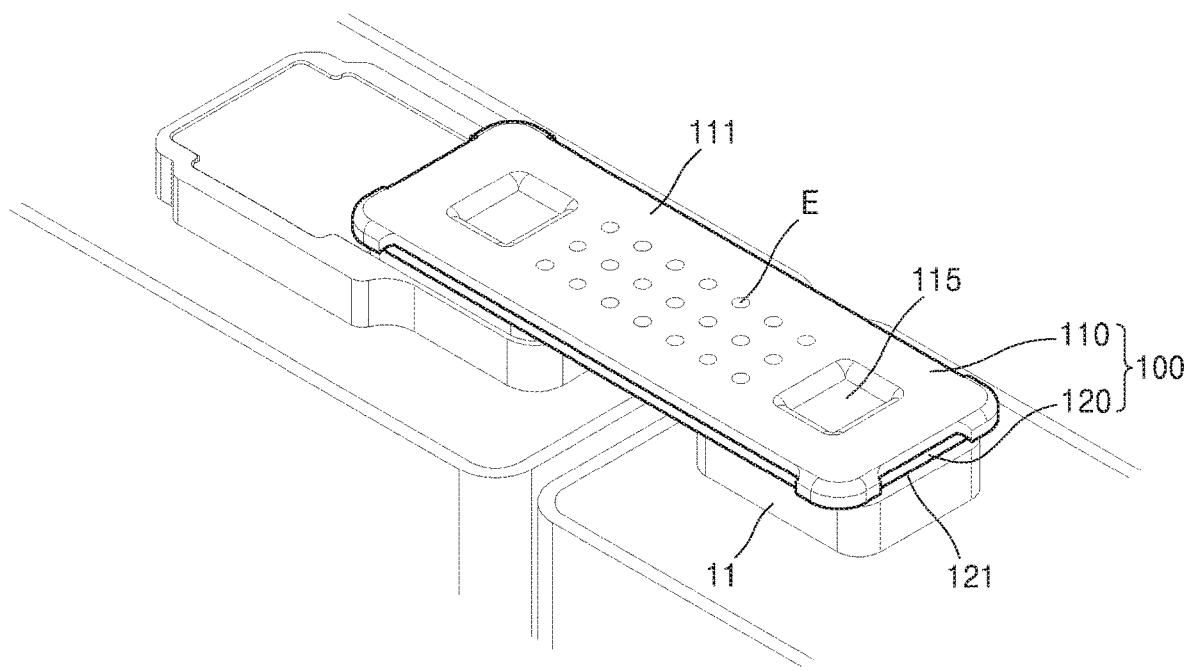
FIG. 6 is a perspective view illustrating a battery module according to another embodiment of the present disclosure.
Figure 7:
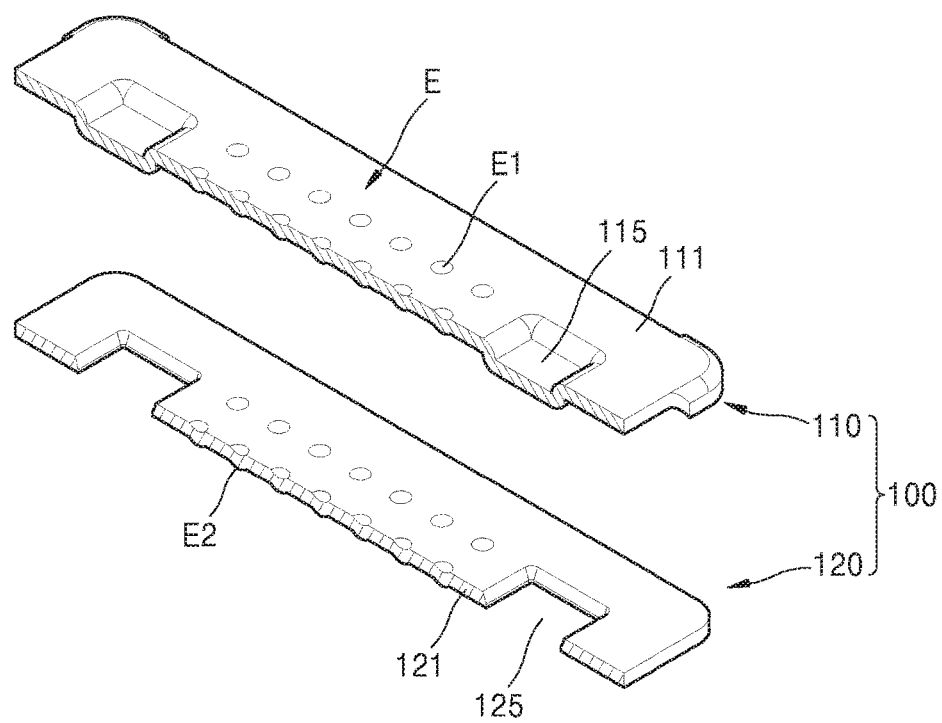
FIG. 7 is an exploded perspective view illustrating a bus bar depicted in FIG. 6.

FIG. 6 is a perspective view illustrating a battery module according to another embodiment of the present disclosure. FIG. 7 is an exploded perspective view illustrating a bus bar depicted in FIG. 6.

Referring to the drawings, a bus bar 100 may be provided on a pair of neighboring electrode terminals 11. The bus bar 100 may include a first bus bar 110 and a second bus bar 120 that are superposed on each other above the electrode terminals 11. The second bus bar 120 may be placed between the electrode terminals 11 and the first bus bar 110. In addition, the first bus bar 110 may make conductive contact with the electrode terminals 11 through coupling portions 115, and the second bus bar 120 may make conductive contact with the electrode terminals 11 through portions around penetration holes 125.

The first bus bar 110 may include a main body 111 and the coupling portions 115 stepped toward the electrode terminals 11. The second bus bar 120 may include a main body 121 and the penetration holes 125 which are open toward the electrode terminals 11. In this case, the main body 111 of the first bus bar 110 and the main body 121 of the second bus bar 120 may be electrically in contact with each other. The first and second bus bars 110 and 120 share the flow of current between connection targets, that is, between the pair of electrode terminals 11. The second bus bar 120 may be formed of a metallic material different from a material of the first bus bar 110 to supplement the thermal and electrical characteristics of the first bus bar 110 and may share the flow of current with the first bus bar 110.

Matching portions E may be formed on the main bodies 111 and 121 of the first and second bus bars 110 and 120 to guarantee more secure coupling between the main bodies 111 and 121 of the first and second bus bars 110 and 120. For example, the matching portions E may include first and second matching portions E1 and E2 having complementary shapes. The first and second matching portions E1 and E2 may be respectively formed on the first and second bus bars 110 and 120. The first and second matching portions E1 and E2 may form complementary convex and concave portions at mutually-facing positions of the first and second bus bars 110 and 120. For example, the first matching portions E1 may form convex portions on a lower surface of the first bus bar 110 and may be inserted into concave portions of the second matching portions E2. The second matching portions E2 may form the concave portions on an upper surface of the second bus bar 120 and may receive the convex portions of the first matching portions E1.

The matching portions E guarantee secure coupling between the first and second bus bars 110 and 120 and increase the contact area and coupling strength between the first and second bus bars 110 and 120, thereby reducing contact resistance between the first and second bus bars 110 and 120. The second bus bar 120 is formed of a metallic material different from the first bus bar 110 to supplement the thermal and electrical characteristics of the first bus bar 110. In this case, owing to the matching portions E reducing the contact resistance between the first and second bus bars 110 and 120, current may smoothly flow between the first and second bus bars 110 and 120, and the characteristics of the bus bar 100 may be improved by cooperation between the first and second bus bars 110 and 120.

In an exemplary embodiment, the matching portions E may be formed as embossed patterns. However, the matching portions E is not limited to the embossed patterns. The matching portions E may have various shapes as long as the matching portions E have matching shapes for increasing the contact area and coupling strength between the first and second bus bars 110 and 120.

Figure 8:
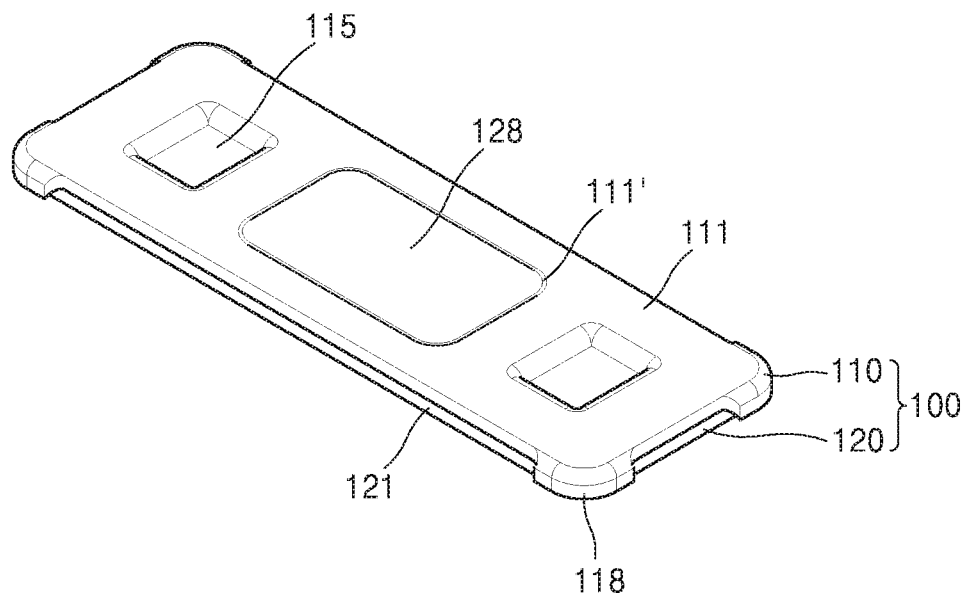
FIG. 8 is a view illustrating a bus bar according to another embodiment of the present disclosure.
Figure 9:
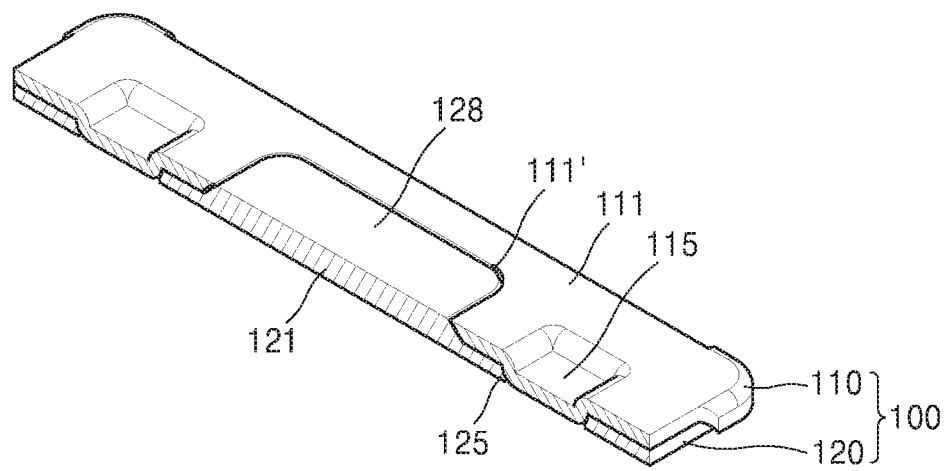
FIG. 9 is a cut-away view illustrating the bus bar depicted in FIG. 8.

FIG. 8 is a view illustrating a bus bar according to another embodiment of the present disclosure. FIG. 9 is a cut-away view illustrating the bus bar depicted in FIG. 8.

Referring to the drawings, a bus bar 100 may include a first bus bar 110 and a second bus bar 120 that are superposed on each other. For example, the first bus bar 110 may be formed of a first metallic material by considering weldability to electrode terminals 11, and the second bus bar 120 may be formed of a second metallic material different from the first metallic material to supplement the thermal and electrical characteristics of the first bus bar 110.

The first and second bus bars 110 and 120 make conductive contact with each other. For example, main bodies 111 and 121 of the first and second bus bars 110 and 120 may make conductive contact with each other. In this case, matching portions 111' and 128 may be formed on the main bodies 111 and 121 of the first and second bus bars 110 and 120 to increase the contact area and coupling strength between the first and second bus bars 110 and 120.

The matching portions 111' and 128 may include an opening 111' and a protrusion 128 that have complementary shapes. More specifically, the main body 111 of the first bus bar 110 may include the opening 111', and the main body 121 of the second bus bar 120 may include the protrusion 128 insertable into the opening 111'. As a whole, the first and second bus bars 110 and 120 may be coupled to each other through coupling portions 115 and penetration holes 125, and along with this, the first and second bus bars 110 and 120 may be additionally coupled to each other through the opening 111' and the protrusion 128. In this manner, the first and second bus bars 110 and 120 are coupled to each other by a double insertion structure at different positions in a length direction thereof, thereby increasing the contact area and coupling strength between the first and second bus bars 110 and 120.

The second bus bar 120 may be formed of a metallic material having thermal and electrical characteristics superior to the thermal and electrical characteristics of the first bus bar 110. Thus, the protrusion 128 substantially contributing to conduction of current may be formed on the second bus bar 120, and the opening 111' may be formed in the first bus bar 110.

As described above, the matching portions 111' and 128 formed on the main bodies 111 and 121 of the first and second bus bars 110 and 120 may include: the opening 111' formed in one of the main bodies 111 and 121 of the first and second bus bars 110 and 120; and the protrusion 128 formed on the other of the main bodies 111 and 121 of the first and second bus bars 110 and 120 and insertable into the opening 111'. For example, in the embodiment shown in FIGS. 8 and 9, the main body 111 of the first bus bar 110 may include the opening 111', and the main body 121 of the second bus bar 120 may include the protrusion 128 insertable into the opening 111'. Alternatively, in another embodiment of the present disclosure, the main body 121 of the second bus bar 120 may include an opening (not shown), and the main body 111 of the first bus bar 110 may include a protrusion (not shown) insertable into the opening (not shown).

While embodiments of the present disclosure have been described with reference to the accompanying drawings, the embodiments are for illustrative purposes only, and it will be understood by those of ordinary skill in the art that various modifications and equivalent other embodiments may be made therefrom. Therefore, the scope and spirit of the present disclosure should be defined by the following claims.

INDUSTRIAL APPLICABILITY

The present disclosure may be applied to batteries, that is, rechargeable energy sources, and various devices using batteries as power supplies.

The invention claimed is:

1. A battery module comprising:
   a plurality of battery cells each comprising an electrode terminal; and
   a bus bar connected to the electrode terminals of the battery cells neighboring each other to electrically connect neighboring battery cells, the bus bar comprising a first bus bar and a second bus bar that are superposed on each other and comprise different metals, each of the first and second bus bars making conductive contact with the electrode terminals, the first bus bar comprising coupling portions protruding through the second bus bar and contacting the electrode terminals, the coupling portions being integrally formed with a remainder of the first bus bar,
   wherein the coupling portions of the first bus bar are coupled to the electrode terminals through penetration holes of the second bus bar.

2. The battery module of claim 1, wherein the second bus bar is placed between the first bus bar and the electrode terminals.

3. The battery module of claim 1, wherein each of the first and second bus bars makes contact with the electrode terminals.

4. The battery module of claim 1, wherein the first bus bar comprises:
   a main body, and
   wherein the coupling portions are stepped from the main body toward the electrode terminals and coupled to the electrode terminals.

5. The battery module of claim 4, wherein the second bus bar comprises:
   a main body; and
   the penetration holes facing the coupling portions.

6. The battery module of claim 5, wherein the coupling portions of the first bus bar are welded to the electrode terminals.

7. The battery module of claim 5, wherein the first and second bus bars have a rectangular shape with four edges at right angles and rounded corners, and guide portions are provided on corner portions of the first bus bar, the guide portions protruding toward the second bus bar and surrounding corner portions of the second bus bar.

8. The battery module of claim 5, wherein the main body of the first bus bar and the main body of the second bus bar make conductive contact with each other.

9. The battery module of claim 5, wherein the main body of the first bus bar and the main body of the second bus bar comprise matching portions, the matching portions having complementary shapes for reducing contact resistance therebetween.

10. The battery module of claim 9, wherein the matching portions comprise:

a convex portion provided on one of the main bodies of the first and second bus bars; and a concave portion provided on an other of the main bodies of the first and second bus bars for receiving the convex portion.

11. The battery module of claim 9, wherein the matching portions comprise:

an opening formed in the main body of the first bus bar; and a protrusion provided on the main body of the second bus bar and configured to be insertable into the opening.

12. The battery module of claim 1, wherein slopes inclined with respect to contact surfaces of the electrode terminals contacting the first bus bar are provided on ends of the coupling portions of the first bus bar and the penetration holes of the second bus bar.

13. The battery module of claim 1, wherein the first bus bar comprises a same metal as the electrode terminals of the battery cells.

14. The battery module of claim 13, wherein the second bus bar comprises a metal different from the electrode terminals of the battery cells.

15. The battery module of claim 14, wherein the second bus bar comprises a metallic material having higher electrical conductivity than the first bus bar.

16. A battery module comprising:

a plurality of battery cells each comprising an electrode terminal; and a bus bar connected to the electrode terminals of the battery cells neighboring each other to electrically connect neighboring battery cells, the bus bar comprising a first bus bar and a second bus bar that are superposed on each other and comprise different metals, each of the first and second bus bars making conductive contact with the electrode terminals, the first bus bar comprising coupling portions protruding through the second bus bar and contacting the electrode terminals, the coupling portions being integrally formed with a remainder of the first bus bar, wherein a main body of the first bus bar forms a non-contact portion that does not make contact with the electrode terminals, and wherein a main body of the second bus bar comprises contact portions that make contact with the electrode terminals.

17. The battery module of claim 16, wherein the contact portions are provided around penetration holes of the second bus bar.

* * * * *